(12) United States Patent
Kamat et al.

(10) Patent No.: US 11,096,240 B2
(45) Date of Patent: Aug. 17, 2021

(54) SYSTEMS AND METHODS FOR A CONNECTION RELEASE PROCEDURE BETWEEN USER EQUIPMENT AND A BASE STATION

(71) Applicant: Verizon Patent and Licensing Inc., Arlington, VA (US)

(72) Inventors: Sachin Kamat, East Brunswick, NJ (US); Jeremy Nacer, Denville, NJ (US); Sudhir Patel, Boonton, NJ (US); Leon Russell, Fanwood, NJ (US); David G. Greiner, New Hyde Park, NY (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/570,239

(22) Filed: Sep. 13, 2019

(65) Prior Publication Data
US 2021/0084709 A1 Mar. 18, 2021

(51) Int. Cl.
| | |
|---|---|
| *H04W 76/36* | (2018.01) |
| *H04W 68/00* | (2009.01) |
| *H04L 1/18* | (2006.01) |
| *H04B 17/336* | (2015.01) |
| *H04W 76/27* | (2018.01) |
| *H04W 24/10* | (2009.01) |
| *H04L 5/00* | (2006.01) |

(52) U.S. Cl.
CPC ......... *H04W 76/36* (2018.02); *H04B 17/336* (2015.01); *H04L 1/189* (2013.01); *H04L 5/0055* (2013.01); *H04W 24/10* (2013.01); *H04W 68/005* (2013.01); *H04W 76/27* (2018.02)

(58) Field of Classification Search
CPC .... H04W 76/36; H04W 76/27; H04B 17/336; H04L 5/0055; H04L 1/189
See application file for complete search history.

(56) References Cited

U.S. PATENT DOCUMENTS

| | | | |
|---|---|---|---|
| 2014/0092799 A1* | 4/2014 | Jain | H04L 5/0035 370/311 |
| 2014/0334389 A1* | 11/2014 | Abdel-Samad | H04W 76/30 370/329 |
| 2018/0176834 A1* | 6/2018 | Wei | H04W 36/0066 |
| 2018/0279174 A1* | 9/2018 | Yannick | H04W 40/34 |
| 2020/0100306 A1* | 3/2020 | Ayaz | H04W 8/005 |

* cited by examiner

*Primary Examiner* — Kevin M Cunningham

(57) ABSTRACT

A base station may cause a user equipment (UE) to be connected to a network, wherein an attach request message, that is used to connect the UE to the network, includes one or more eligibility parameters for a connection release service. The base station may determine, based on the one or more eligibility parameters, that the UE is to receive the connection release service. The base station may provide, to the UE, a connection release message that is provided based on determining that the UE is to receive the connection release service. The base station may receive, from the UE, a connection release acknowledgement message that indicates that the connection release message has been received by the UE. The base station may perform one or more actions associated with changing a state of the UE based on receiving the connection release acknowledgement message.

20 Claims, 9 Drawing Sheets

SYSTEMS AND METHODS FOR A CONNECTION RELEASE PROCEDURE BETWEEN USER EQUIPMENT AND A BASE STATION

BACKGROUND

A radio resource control (RRC) connection release procedure may be used to change a state that a user equipment (UE) has while connected to a network. For example, if the UE becomes inactive for a threshold time period, a base station may provide, to the UE, an RRC connection release message that has been encapsulated using a data-link-layer header. The RRC connection release message may notify the UE that a state of the UE has changed from a connected state to a different state (e.g., an idle state, a disconnected state, and/or the like).

DETAILED DESCRIPTION OF PREFERRED EMBODIMENTS

Figure 1A:
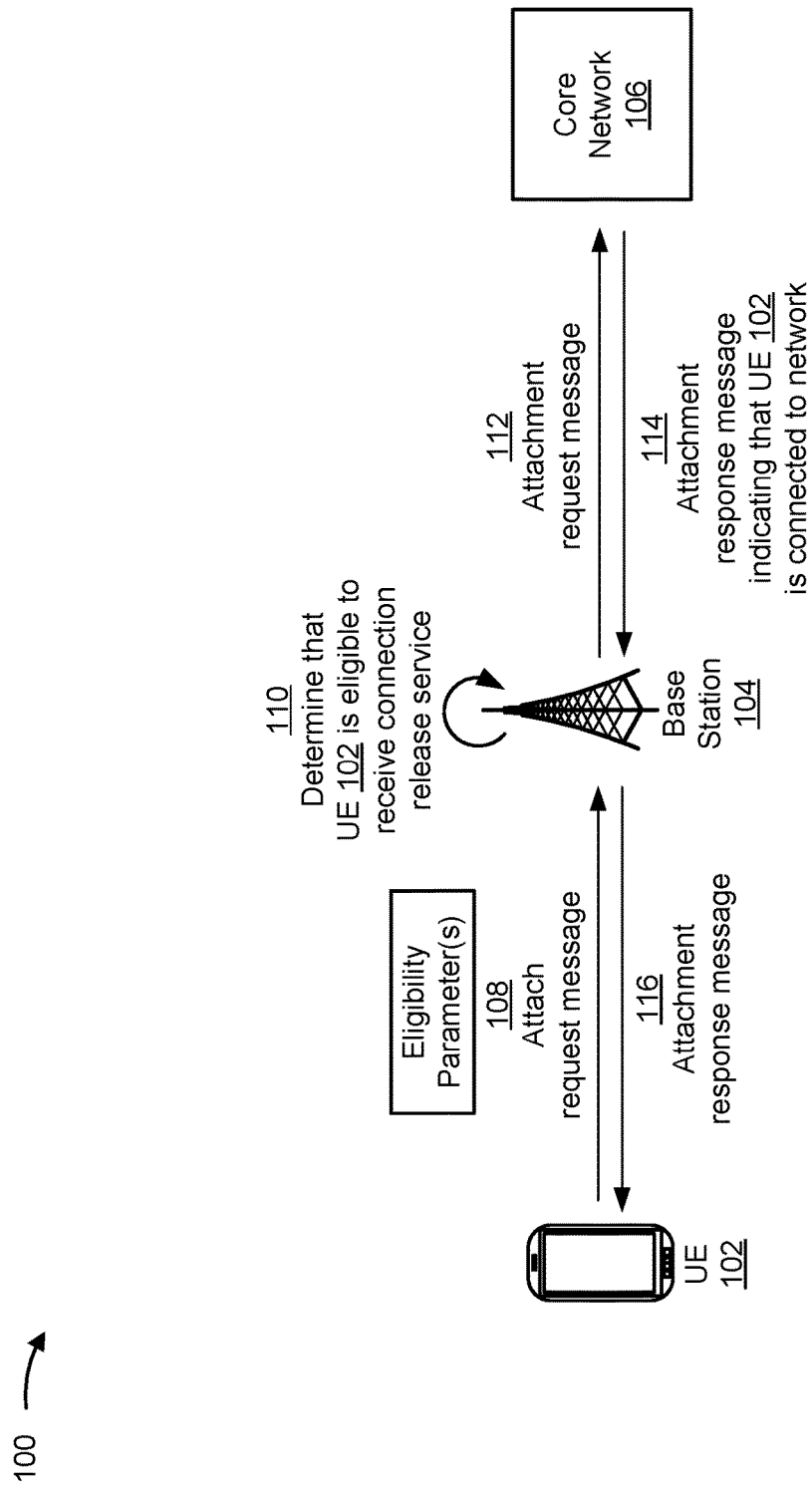
FIGS. 1A-1C are diagrams of one or more example implementations described herein.

The following detailed description of example implementations refers to the accompanying drawings. The same reference numbers in different drawings may identify the same or similar elements.

A user equipment (UE) that is connected to a network may be in a state that indicates whether the UE has a connection with the network, a state that indicates a type of connection that the UE has with the network, and/or the like. For example, a UE that is connected to a network may be in a connected state while using one or more services that are available via the network, may be in an idle state while the UE remains connected to the network but is not presently using the one or more services, may be in a disconnected state that indicates that the UE is no longer connected to the network, and/or the like.

In some cases, while the UE is connected to the network, a base station may notify the UE that a state of the UE has changed (or is to be changed). For example, the base station may provide the UE with a connection release message, such as a radio resource control (RRC) connection release message, to notify the UE that the state has changed from a connected state to a new state, such as an idle state, a disconnected state, and/or the like.

However, in some cases, the UE may not receive the connection release message and therefore may not be notified of the state change. For example, poor network performance (e.g., poor radio frequency (RF) coverage, low bandwidth and/or throughput, and/or the like) may prevent the UE from receiving the connection release message. As another example, the UE may be prevented from receiving the connection release message and/or from being able to properly decode the connection release message if the UE has an overlap between a measurement gap period and a period for reception of system information (e.g., for reception of system information blocks (SIBs)). To provide a specific example, if there is an overlap between a measurement gap period and a period for reception of SIBs, the UE may be unable to decode a downlink message, which may prevent the UE from being able to understand the connection release message.

Furthermore, there is no mechanism available that will allow the UE to notify the base station that the connection release message has been received (or not received). Consequently, the base station may reassign resources that had been assigned to the UE, regardless of whether the UE has received an indication that the state has changed. The UE may then waste resources (e.g., processing resources, network resources, and/or the like) to attempt to use a service via an old connection to the network. Additionally, resources of the UE, the base station, and/or other core network devices may be wasted in reconnecting the UE to the network. For example, resources of the base station may be wasted because the base station has to assign new resources to the UE, despite the fact that the UE would otherwise have already been connected to the network.

According to some implementations described herein, a base station may use a connection release service to notify a UE that a state that the UE has with a network has changed (or is to be changed). In some implementations, the base station may provide the UE with a connection release message that has been encapsulated with a network-layer-header. In some implementations, the connection release service may cause the base station to be provided with a connection release acknowledge message that indicates that the UE has received notice that the state has changed (or is to be changed). In some implementations, the base station may be configured with one or more conditions that must be satisfied for the UE to be eligible to receive the connection release service (and/or for the UE to actually receive the connection release service). The connection release service may allow the UE to be notified that the state of the UE has changed (or is to be changed) to a new state (e.g., from a connected state to an idle state, to a disconnected state, and/or the like).

In this way, the connection release service ensures that the UE is notified when the state of the UE changes and/or ensures that the base station is provided with an acknowledgement that the UE has been notified. By using the connection release message to notify the UE of the state change, resources of the UE are conserved relative to an inferior technique where the UE is not notified of the state change, and therefore may waste resources attempting to use a service via the network with an old connection (e.g., despite no longer being in a connected state and thus lacking an appropriate network connection), may waste resources (e.g., processing resources, network resources, memory resources, and/or the like) reconnecting to the network, and/or the like.

Additionally, the base station may, based on receiving the connection release acknowledgement message from the UE, cause resources that are reserved for the UE to be made available to one or more other UEs. Without acknowledgement from the UE, processing resources of the base station might be wasted in unassigning resources from the UE and/or reassigning those resources to one or more other UEs, processing resources of the base station, the UE, and/or one or more other network devices might be wasted in assisting the UE in reconnecting to the network, and/or the like.

Figure 1B:
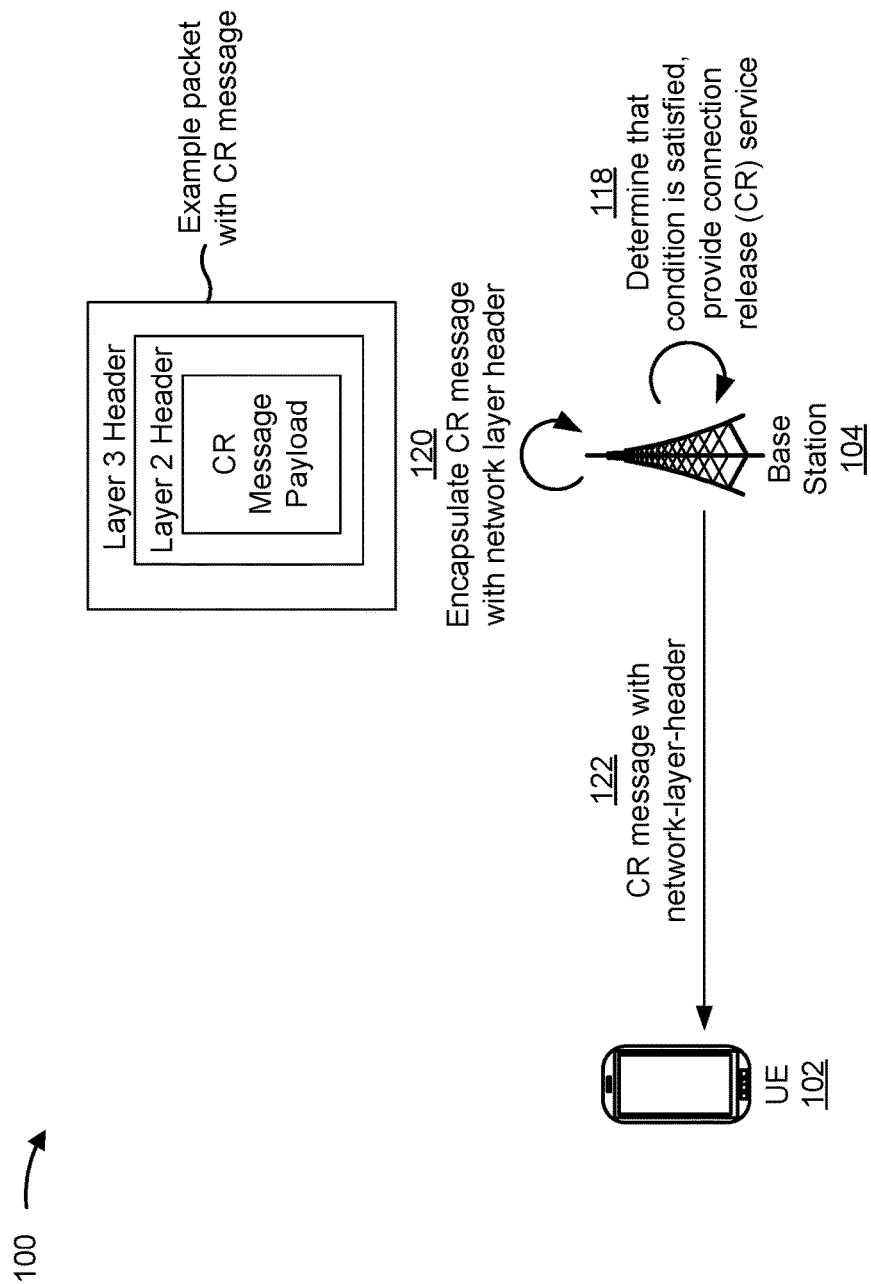
Figure 1C:
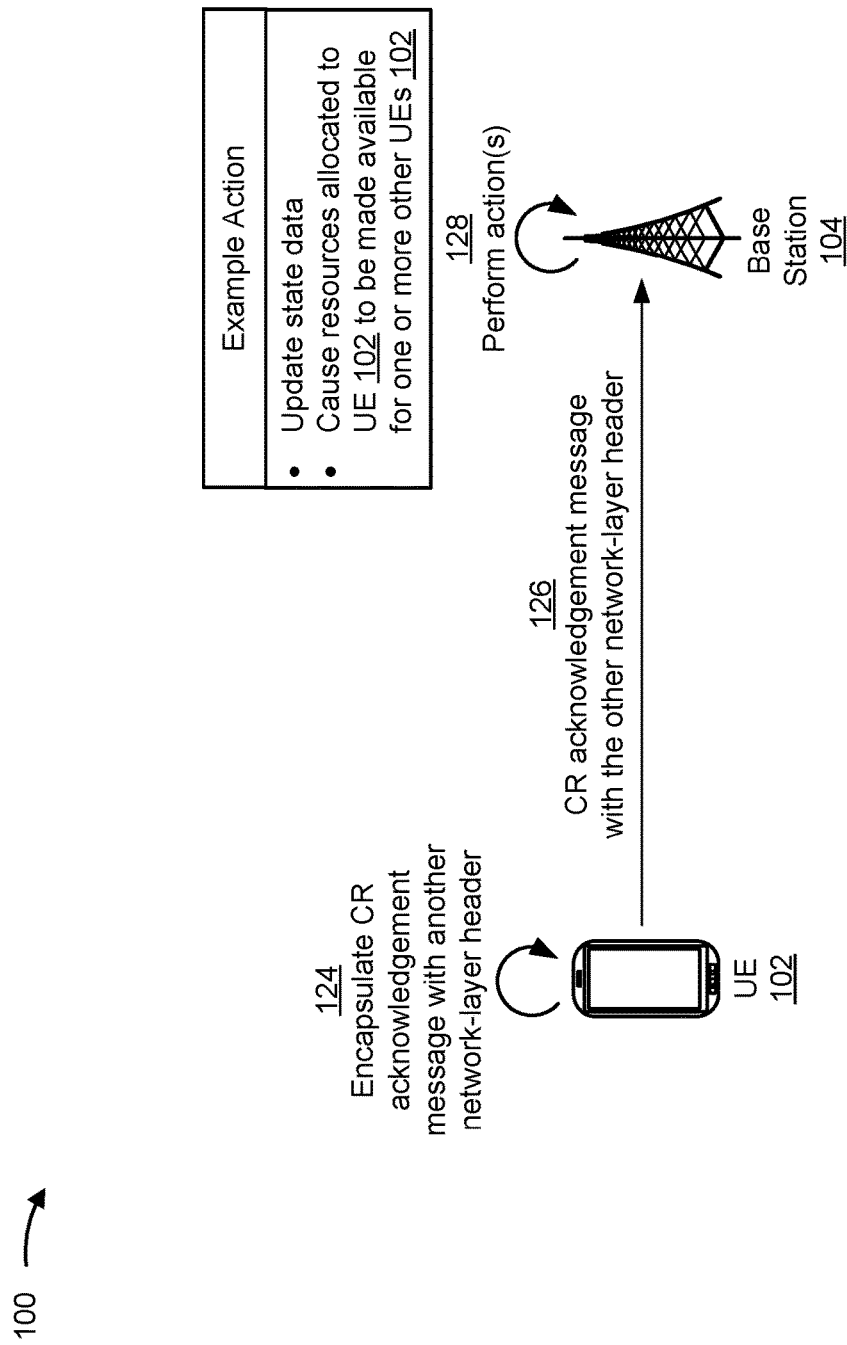

FIGS. 1A-1C are diagrams of one or more example implementations 100 described herein. For example, example implementation(s) 100 may include a UE 102, a base station 104, and a core network 106.

As shown in FIGS. 1A-1C, base station 104 may use a connection release service to notify UE 102 that a state of UE 102 has changed (or is to be changed). For example, UE 102 may have a state that represents a status that UE 102 has with core network 106. The state may be a connected state that indicates that UE 102 is in a connected mode (e.g., and connected to core network 106), an idle state that indicates that UE 102 is in an idle mode, an airplane state that indicates that UE 102 is in an airplane mode, a disconnected state that indicates that UE 102 is not connected to core network 106, and/or the like. In some cases, the state of UE 102 may be a radio resource control (RRC) state, such as a dedicated channel connected state (e.g., a CELL_DCH state), a reduced resources state (e.g., a CELL_FACH state, a CELL_PCH state, a URA_PCH state, an idle state, and/or the like), and/or the like.

The connection release service may be a service that allows base station 104 to provide UE 102 with a connection release message that indicates that a state of UE 102 has changed (or is to be changed). The connection release message may, for example, be an RRC connection release message and/or a similar type of message. Additionally, the connection release service may cause UE 102 to provide base station 104 with a connection release acknowledgement message that indicates that UE 102 has received the connection release message. The connection release acknowledgement message may, for example, be an RRC connection release acknowledgement message and/or a similar type of message. Additional details are provided herein.

As shown in FIG. 1A, UE 102 may establish a connection with core network 106 (e.g., to utilize one or more services that are available via core network 106). Some implementations described herein involve communications between UE 102, base station 104, and/or core network 106. In these implementations, the communications may be supported via a communication interface, such as an air interface, an application programming interface (API), and/or another type of communication interface. In some implementations, the communications may be supported by one or more protocols, such as an RRC protocol and/or another type of protocol that may be used to support data communications over core network 106. Core network 106 may be a third generation (3G) network, a fourth generation (4G) network (e.g., a 4G long-term evolution (LTE) network), a fifth generation (5G) network, a next generation network, and/or the like.

To establish the connection with core network 106, and as shown by reference number 108, UE 102 may provide an attach request message to base station 104. The attach request message may include one or more eligibility parameters that indicate whether UE 102 is eligible for the connection release service, that specify when UE 102 is to receive the connection release service, and/or the like. For example, the one or more eligibility parameters may include a value that indicates whether UE 102 is eligible for the connection release service, a device type identifier that identifies a device type of UE 102, a device type category identifier that identifies a category of the device type of UE 102, a threshold network performance indicator (NPI) value, and/or the like.

To provide an example, the one or more eligibility parameters may include the value that indicates whether UE 102 is eligible for the connection release service. In this example, base station 104 may be configured to provide the connection release services if the one or more eligibility parameters include the value that indicates that UE 102 is eligible for the connection release service.

To provide another example, the one or more eligibility parameters may include the device type identifier. In this example, base station 104 may be configured to provide the connection release service to specific types of devices. The device type identifier may, for example, identify UE 102 as a mobile device (e.g., a smartphone), as an internet of things (IoT) device, as a machine-to-machine (M2M) device, as a 4G device, as a 5G device, and/or the like. By including the device type identifier in the attach request message, base station 104 will be able to determine whether to provide UE 102 with the connection release service, as will be described further herein.

To provide another example, the one or more eligibility parameters may include the device type category identifier. In this example, base station 104 may be configured to provide the connection release service to specific categories of devices (e.g., a category may serve as a subset of a particular type of device). The device type category identifier may, for example, identify UE 102 as being a category one (CAT-1) device, a narrowband (NB) category device (e.g., a CAT-NB1 device, a CAT-NB2 device, and/or the like), a category M device (e.g., a CAT-M1 device), a device that is defined by a 5G device type category, and/or the like. By including the device type category identifier in the attach request message, base station 104 will be able to determine whether to provide UE 102 with the connection release service, as will be described further herein.

To provide another example, the one or more eligibility parameters may include the threshold NPI value, such as a signal-to-interference-plus-noise ratio (SINR) value, a reference signal received power (RSRP) value, a reference signal received quality (RSRQ) value, a quality of service (QoS) value, a bandwidth value, a latency value, a throughput value, and/or the like. In this example, while UE 102 is connected to core network 106, UE 102 may periodically report NPI values associated with the connection that UE 102 has with core network 106. Additionally, base station 104 may have access to one or more corresponding threshold NPI values, and may be configured to provide the connection release service if a particular reported NPI value satisfies a corresponding threshold NPI value. Additional details and examples are provided further herein.

As shown by reference number 110, base station 104 may determine that UE 102 is eligible to receive the connection release service. For example, base station 104 may identify the one or more eligibility parameters in the attach request message to determine that UE 102 is eligible to receive the connection release service. In some implementations, even if UE 102 is eligible to receive the connection release service, base station 104 may make a real-time determination as to whether to provide UE 102 with the connection release service at a given time period, as will be described further herein.

In some implementations, base station 104 may use a data structure to store the one or more eligibility parameters. For example, base station 104 may use a data structure to store the one or more eligibility parameters in association with an identifier of UE 102, in association with a session identifier for a session that UE 102 is using for a service, and/or the like. This may allow base station 104 to reference the one or more eligibility parameters when determining whether to provide UE 102 with the connection release service. As a specific example, if the one or more eligibility parameters include a threshold NPI value, base station 104 may use the data structure to store the threshold NPI value, such that base station 104 may receive an NPI value from UE and may compare the NPI value with the threshold NPI value to determine whether to provide UE 102 with the connection release service, as described further herein.

As shown by reference number 112, base station 104 may provide the attach request message to core network 106. For example, base station 104 may provide the attach request message to one or more devices of core network 106, such as a mobility management entity (MME), a serving gateway (SGW), a packet data network (PDN) gateway (PGW), and/or the like. This may allow the PGW (or another device within core network 106) to generate an attachment response message and may, as shown by reference number 114, cause the attachment response message to be provided to base station 104. The attachment response message may indicate that UE 102 is connected to core network 106. For example, the attachment response message may include a state value that indicates that UE 102 is in a connected state.

In some implementations, base station 104 may connect UE 102 to a 5G network. In this case, the attach request may be provided to one or more elements of the 5G network, such as a network slice selection function (NSSF), a network exposure function (NEF), an authentication server function (AUSF), a unified data management (UDM) component, a policy control function (PCF), an application function (AF), an access and mobility management function (AMF), a session management function (SMF), a user plane function (UPF), and/or the like.

In some implementations, base station 104 may update the data structure (or another data structure) with state data that identifies the state of UE 102. For example, base station 104 may update the data structure with the state data to allow base station 104 to keep a record of a current state of UE 102 and/or any other UEs 102 that are using base station 104 to connect to core network 106, to allow base station 104 to update the record of the current state of UE 102 and/or any other UEs 102 that are using base station 104 to connect to core network 106, and/or the like.

As shown by reference number 116, base station 104 may provide the attachment response message to UE 102. This may notify UE 102 that the connection to core network 106 has been established. In some implementations (not shown), UE 102 may provide (e.g., using base station 104 as an intermediary) core network 106 with an acknowledgement message indicating that UE 102 has received the attachment response message.

In this way, UE 102 connects to core network 106 in a manner that uses the one or more eligibility parameters to notify base station 104 that UE 102 is eligible for the connection release service.

As shown in FIG. 1B, and by reference number 118, base station 104 may determine to provide UE 102 with the connection release service. For example, base station 104 may determine to provide UE 102 with the connection release service based on one or more conditions being satisfied. In this case, base station 104 may be configured with one or more conditions that, if satisfied, cause base station 104 to provide UE 102 with the connection release service. The one or more conditions may include a first condition that is satisfied if UE 102 stops communicating with core network 106 for a threshold time period, a second condition that is satisfied if resource usage of UE 102 satisfies a threshold resource usage, a third condition that is satisfied if an NPI value reported by UE 102 satisfies a corresponding threshold NPI value, and/or the like, as further described below.

In some implementations, base station 104 may determine to provide UE 102 with the connection release service based on the first condition being satisfied. For example, a user may stop using UE 102 to access a service that is provided via core network 106, and base station 104 may monitor a quantity of time that has passed since UE 102 has used network resources for the service. If the quantity of time that has passed since UE 102 has used network resources satisfies a threshold quantity of time, base station 104 may determine to provide UE 102 with the connection release service.

Additionally, or alternatively, base station 104 may determine to provide UE 102 with the connection release service based on the second condition being satisfied. For example, base station 104 may periodically compare data identifying a quantity of resources being used by UE 102 with a corresponding resource usage threshold value, and may determine to provide UE 102 with the connection release service based on the quantity of resources satisfying the corresponding resource usage threshold value.

Additionally, or alternatively, base station 104 may determine to provide UE 102 with the connection release service based on the third condition being satisfied. For example, UE 102 may periodically provide base station 104 with NPI values, such as an SINR value, an RSRP value, an RSRQ value, a QoS value, and/or the like. This may allow base station 104 to compare the NPI value with a corresponding threshold NPI value and to determine to provide UE 102 with the connection release service if the NPI value satisfies the corresponding threshold NPI value.

As shown by reference number 120, base station 104 may encapsulate a connection release message with a network-layer header. For example, to provide UE 102 with the connection release service, base station 104 may identify or generate a connection release message, and may encapsulate the connection release message using one or more headers that include a network-layer header. The network-layer header may include data that allows the connection release message to be delivered to a proper destination (e.g., via one or more intermediate devices).

To provide a specific example, base station 104 may first encapsulate the connection release message with a data-link-layer header (and/or footer), such as an RRC header, a media access control (MAC) header, a radio link control (RLC) header, and/or the like. Next, base station 104 may encapsulate the connection release message (e.g., which has already been encapsulated with the data link-layer-header) with a network-layer header, such as an internet protocol (IP) header, an internet packet exchange (IPX) header, an address resolution protocol (ARP) header, a virtual location area network (VLAN) header, and/or the like.

In some implementations, a payload of the connection release message may include state data that includes a value that identifies the state of UE 102, a value that identifies the state of UE 102 and/or a prior-assigned state of UE 102, a value that indicates that the state of UE 102 is to be changed (e.g., base station 104 may be configured to wait until receipt of a connection release acknowledgement message to change the state), and/or the like. In some implementations, the state data may be included in the network-layer-header.

As shown by reference number 122, base station 104 may provide UE 102 with the connection release message that includes the network-layer header. This may notify UE 102 that the state of UE 102 has changed (or is to be changed). In some implementations, UE 102 may not receive the connection release message. A description of these implementations is provided in connection with FIGS. 2A-2C.

In this way, base station 104 provides UE 102 with the connection release message that includes the network-layer header.

As shown in FIG. 1C, and by reference number 124, UE 102 may encapsulate a connection release acknowledgement message with another network-layer header. For example, UE 102 may be configured to generate and/or identify a connection release acknowledgement message based on receiving the connection release message, and may encapsulate the connection release acknowledgement message using another network-layer header.

As shown by reference number 126, UE 102 may provide the connection release acknowledgement message that includes the other network-layer header to base station 104. This may notify base station 104 that UE 102 has received the connection release message.

As shown by reference number 128, base station 104 may perform one or more actions based on receiving the connection release acknowledgement message. For example, base station 104 may update the state data that identifies the state of UE 102, may modify a configuration of available resources, and/or the like, as each described below.

In some implementations, base station 104 may update the state data that identifies the state of UE 102. For example, base station 104 may have been configured to wait to update the state data until after receiving the connection release acknowledgement message from UE 102 and may, based on receipt of that message, update the state data (e.g., that is stored via the data structure).

Additionally, or alternatively, base station 104 may modify a configuration of available resources. The configuration may include a reference signal configuration, such as a demodulation reference signal (DMRS) configuration and/or another type of signal configuration. As an example, base station 104 may have reserved, for UE 102, a set of resource blocks of a channel that is used for communications with core network 106. In this example, base station 104 may, based on receiving the connection release acknowledgement message, modify the set of resource blocks that are assigned to UE 102 (e.g., by unassigning the set of resource blocks from UE 102, by unassigning a subset of the set of resource blocks from UE 102, and/or the like).

In this way, the connection release service ensures that UE 102 is notified when the state of the UE changes and/or ensures that base station 104 is provided with an acknowledgement that UE 102 has been notified.

As indicated above, FIGS. 1A-1C are provided as one or more examples. Other examples may differ from what is described with regard to FIGS. 1A-1C. For example, there may be additional devices and/or networks, fewer devices and/or networks, different devices and/or networks, or differently arranged devices and/or networks than those shown in FIGS. 1A-1C. Furthermore, two or more devices shown in FIGS. 1A-1C may be implemented within a single device, or a single device shown in FIGS. 1A-1C may be implemented as multiple, distributed devices. Additionally, or alternatively, a set of devices (e.g., one or more devices) of example implementation 100 may perform one or more functions described as being performed by another set of devices of example implementation 100. For example, one or more implementations described as being performed by base station 104 may, in other implementations, be performed by UE 102. Additionally, one or more implementations described as being performed by UE 102 may, in other implementations, be performed by base station 104.

Figure 2A:
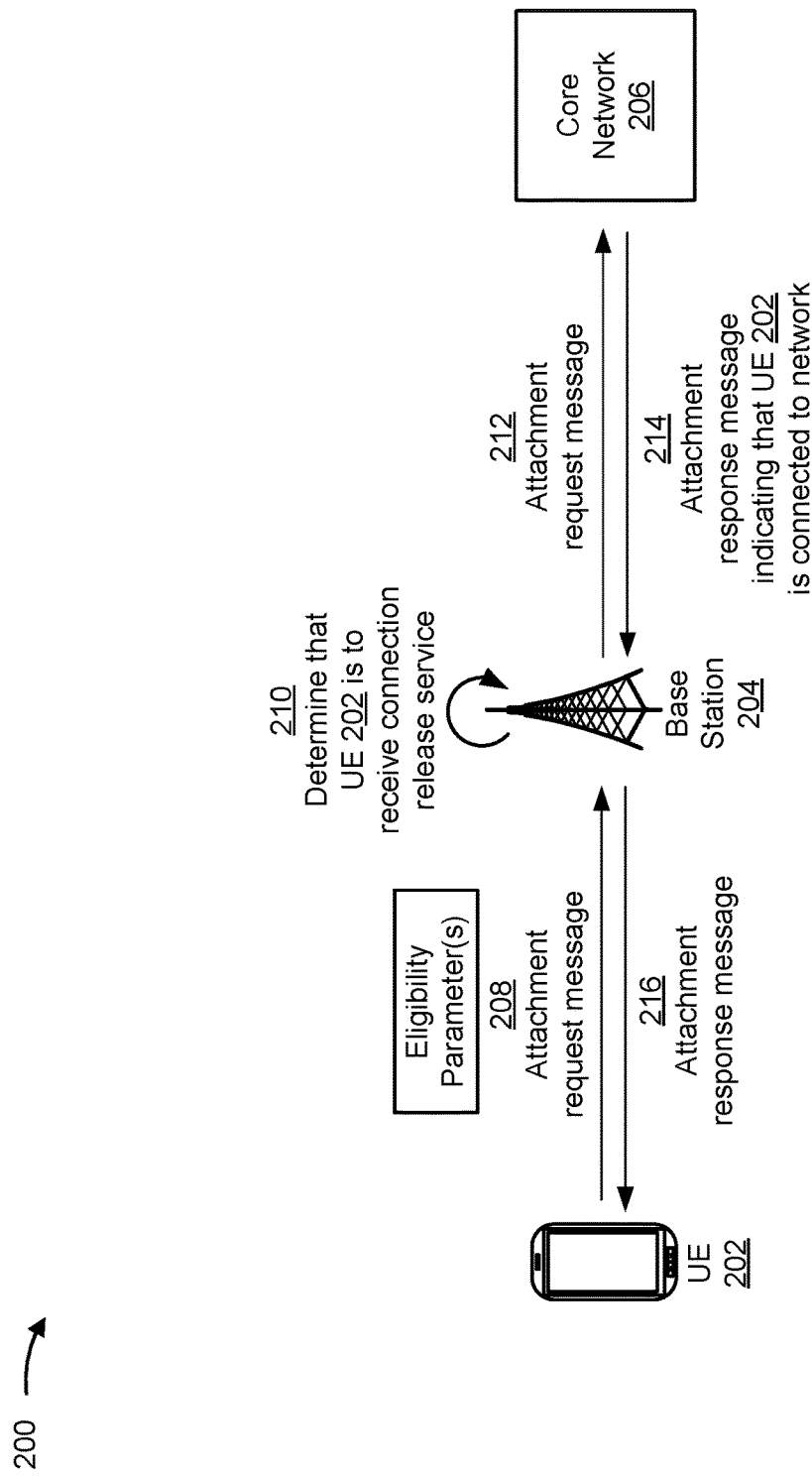
FIGS. 2A-2C are diagrams of one or more example implementations described herein.
Figure 2B:
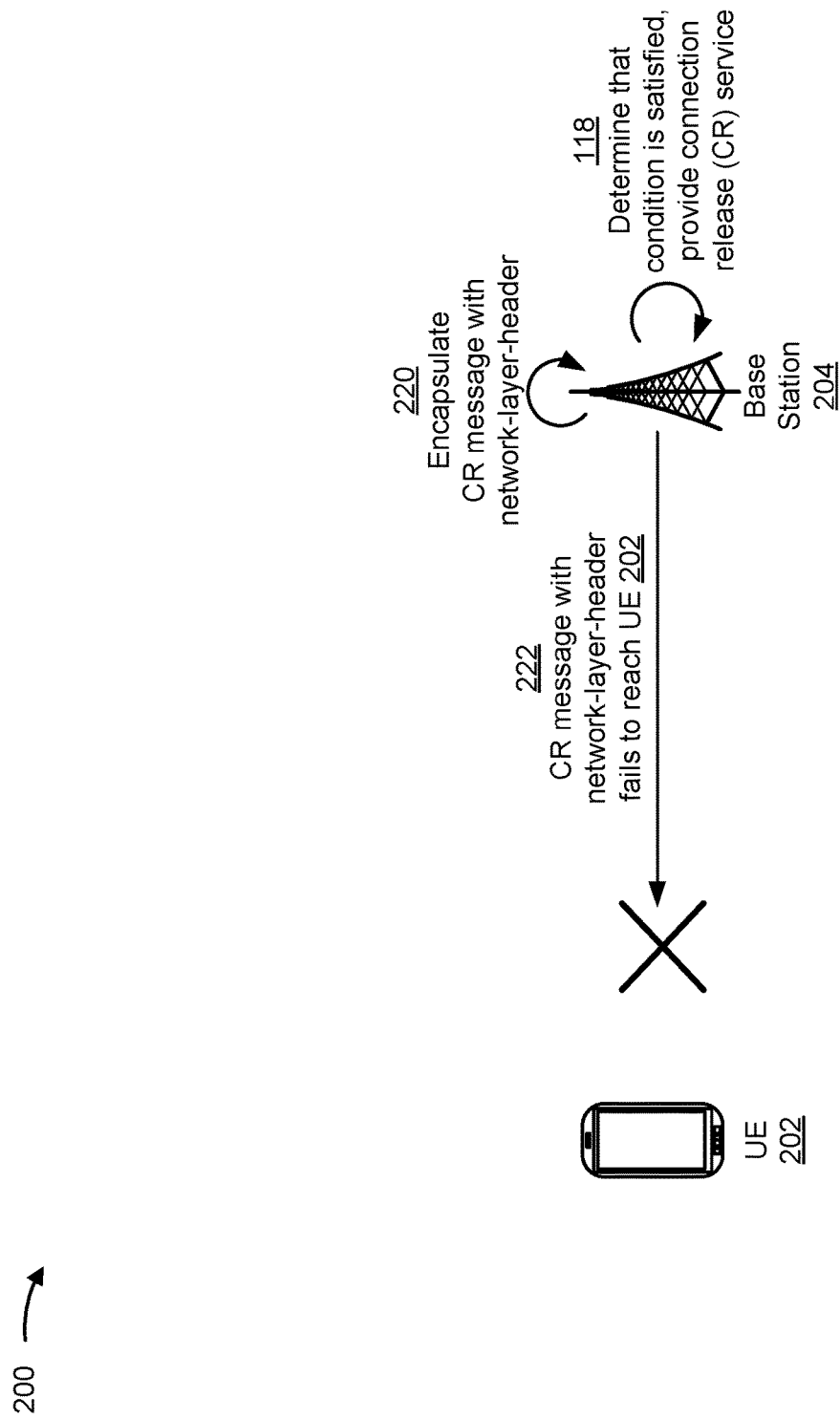
Figure 2C:
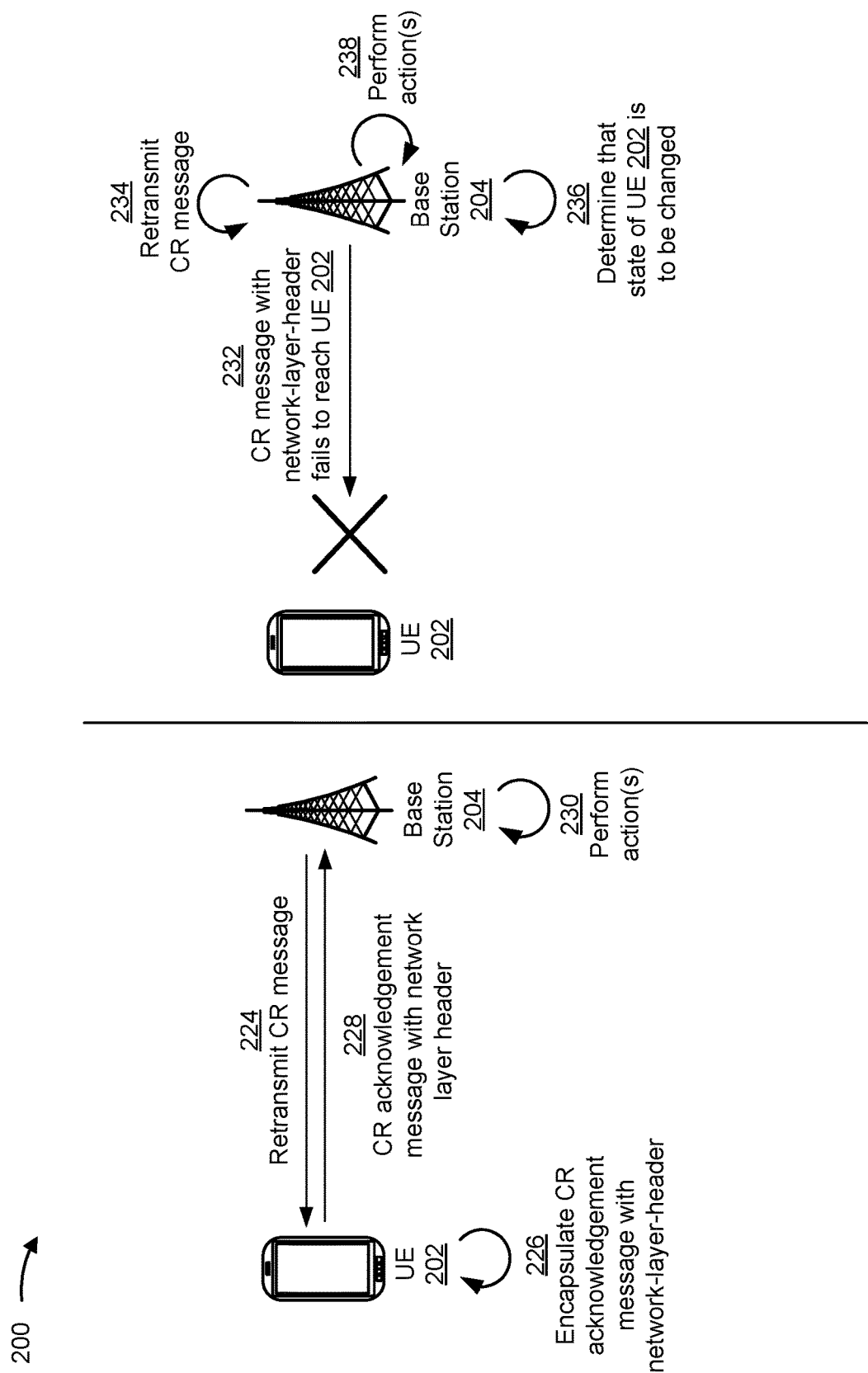

FIGS. 2A-2C are diagrams of one or more example implementations 200 described herein. For example, example implementation(s) 200 may include a UE 202, a base station 204, and a core network 206. FIGS. 2A-2C describe how base station 204 handles situations where UE 202 does not receive a connection release message (e.g., which may be part of a connection release service). One or more implementations described below may include terminology and/or examples that have already been described in connection with FIGS. 1A-1C.

As shown in FIG. 2A, UE 202 may establish a connection with core network 206 (e.g., to utilize one or more services that are available via core network 206). For example, as shown by reference number 208, UE 202 may provide, to base station 204, an attach request message that includes one or more eligibility parameters.

As shown by reference number 210, base station 204 may determine that UE 202 is eligible to receive the connection release service. In some implementations, even if UE 202 is eligible to receive the connection release service, base station 204 may make a real-time determination as to whether to provide UE 202 with the connection release service at a given time period, as further described elsewhere herein. In some implementations, base station 204 may update a data structure with the one or more eligibility parameters.

As shown by reference number 212, base station 204 may provide the attach request message to core network 206. As shown by reference number 214, base station 204 may receive an attachment response message from core network 206. The attachment response message may indicate that UE 202 is connected to core network 206. In some implementations, base station 204 may update the data structure (or another data structure) with state data that identifies the state of UE 202.

As shown by reference number 216, base station 204 may provide the attachment response message to UE 202. This may notify UE 202 that the connection to core network 206 has been established. In some implementations (not shown), UE 202 may provide (e.g., using base station 204 as an intermediary) core network 206 with an acknowledgement message indicating that UE 202 has received the attachment response message.

In this way, UE 202 connects to core network 206 in a manner that uses the one or more eligibility parameters to notify base station 204 that UE 202 is eligible for the connection release service.

As shown in FIG. 2B, and by reference number 218, base station 204 may determine to provide UE 202 with the connection release service. For example, base station 204 may determine to provide UE 202 with the connection release service based on one or more conditions being satisfied. In this case, base station 204 may be configured with one or more conditions that, if satisfied, cause base station 204 to provide UE 202 with the connection release service.

As shown by reference number 220, base station 204 may encapsulate a connection release message with a network-layer header. For example, to provide UE 202 with the connection release service, base station 204 may identify or generate a connection release message and may encapsulate the connection release message using one or more headers that include a network-layer header.

As shown by reference number 222, base station 204 may attempt to provide UE 202 with the connection release message but UE 202 may not receive the message. The connection release message may not reach UE 202 if poor network performance (e.g., poor radio frequency coverage, and/or the like) prevents the connection release message from being received by UE 202, if UE 202 is unable to properly decode the connection release message based on an overlap between a measurement gap period and a period for reception of system information (e.g., for reception of system information blocks), and/or the like.

In this way, UE 202 is unable to receive and/or decode the connection release message that is provided by base station 204.

As shown in FIG. 2C, and by reference numbers 224, 226, 228, and 230, base station 104 may successfully retransmit the connection release message to UE 202 to cause UE 202 to provide base station 204 with a connection release acknowledgement message. For example, and as shown by reference number 224, base station 204 may retransmit the connection release message to UE 202.

In some implementations, base station 204 may retransmit the connection release message based on a retransmission condition being satisfied. For example, base station 204 may be configured with a retransmission condition that allows base station 204 to retransmit the connection release message after a threshold amount of time passes (e.g., relative to a time at which a previous attempt to transmit or retransmit the connection release message was made). Additionally, or alternatively, base station 204 may retransmit the connection release message based on one or more other retransmission conditions. For example, base station 204 may compare an NPI value (e.g., a most recent NPI value received from UE 202) with a corresponding threshold NPI value, and may retransmit the connection release message based on determining that the NPI value satisfies the corresponding threshold NPI value.

As shown by reference number 226, UE 202 may encapsulate a connection release acknowledgement message with another network-layer header. As shown by reference number 228, base station 204 may receive, from UE 202, the connection release acknowledgement message that includes the network-layer header. As shown by reference number 230, base station 204 may perform one or more actions (e.g., as described elsewhere herein) based on receiving the connection release acknowledgement message.

In this way, base station 204 retransmits the connection release message to ensure that UE 202 receives an indication that the state of UE 202 has changed (or is to be changed).

As shown by reference numbers 232, 234, 236, and 238, the connection release message may fail to reach UE 202, and base station 204 may still modify a state that UE 202 is in with core network 206. For example, base station 204 may retransmit the connection release message that includes the network layer header to UE 202. However, UE 202 may not receive the retransmission (e.g., for one or more reasons described above).

As shown by reference number 234, base station 204 may retransmit the connection release message to UE 202 (e.g., over a given time period). For example, base station 204 may periodically retransmit the connection release message to UE 202, may retransmit the connection release message to UE 202 a threshold number of times, and/or the like. As shown by reference number 236, base station 204 may determine that a state of UE 202 is to be changed, despite the fact that UE 202 did not receive the connection release message. For example, base station 204 may determine that the state is to be changed based on the retransmission condition being satisfied a threshold number of times (e.g., within a given time period).

As an example, base station 204 may periodically continue to retransmit the connection release message to UE 202 until a number of transmissions (or retransmissions) satisfy a threshold number of transmissions (or retransmissions). If the threshold is satisfied, base station 204 may stop attempting to retransmit the connection release message and may, based on the threshold being satisfied, determine that the state of UE 202 is to be changed (e.g., despite the fact that UE 202 has not provided the connection release acknowledgement message).

As shown by reference number 238, base station 204 may perform one or more actions. For example, base station 204 may update the state data corresponding to UE 202 with new state data that identifies a new state of UE 202, may cause resources allocated to UE 202 to be made available to one or more other UEs 202, and/or the like.

In this way, the connection release service ensures that UE 202 is notified when the state of UE 202 changes (or is to be changed), ensures that base station 204 is provided with an acknowledgement that UE 202 has been notified, ensures that a mechanism is in place to attempt to retransmit the connection release message in situations where UE 202 does not receive the message, and/or ensures that the state of UE 202 is changed after making multiple attempts to retransmit the message to UE 202.

As indicated above, FIGS. 2A-2C are provided as one or more examples. Other examples may differ from what is described with regard to FIGS. 2A-2C. For example, there may be additional devices and/or networks, fewer devices and/or networks, different devices and/or networks, or differently arranged devices and/or networks than those shown in FIGS. 2A-2C. Furthermore, two or more devices shown in FIGS. 2A-2C may be implemented within a single device, or a single device shown in FIGS. 2A-2C may be implemented as multiple, distributed devices. Additionally, or alternatively, a set of devices (e.g., one or more devices) of example implementation 200 may perform one or more functions described as being performed by another set of devices of example implementation 200. For example, one or more implementations described as being performed by base station 204 may, in other implementations, be performed by UE 202. Additionally, one or more implementations described as being performed by UE 202 may, in other implementations, be performed by base station 204.

Figure 3:
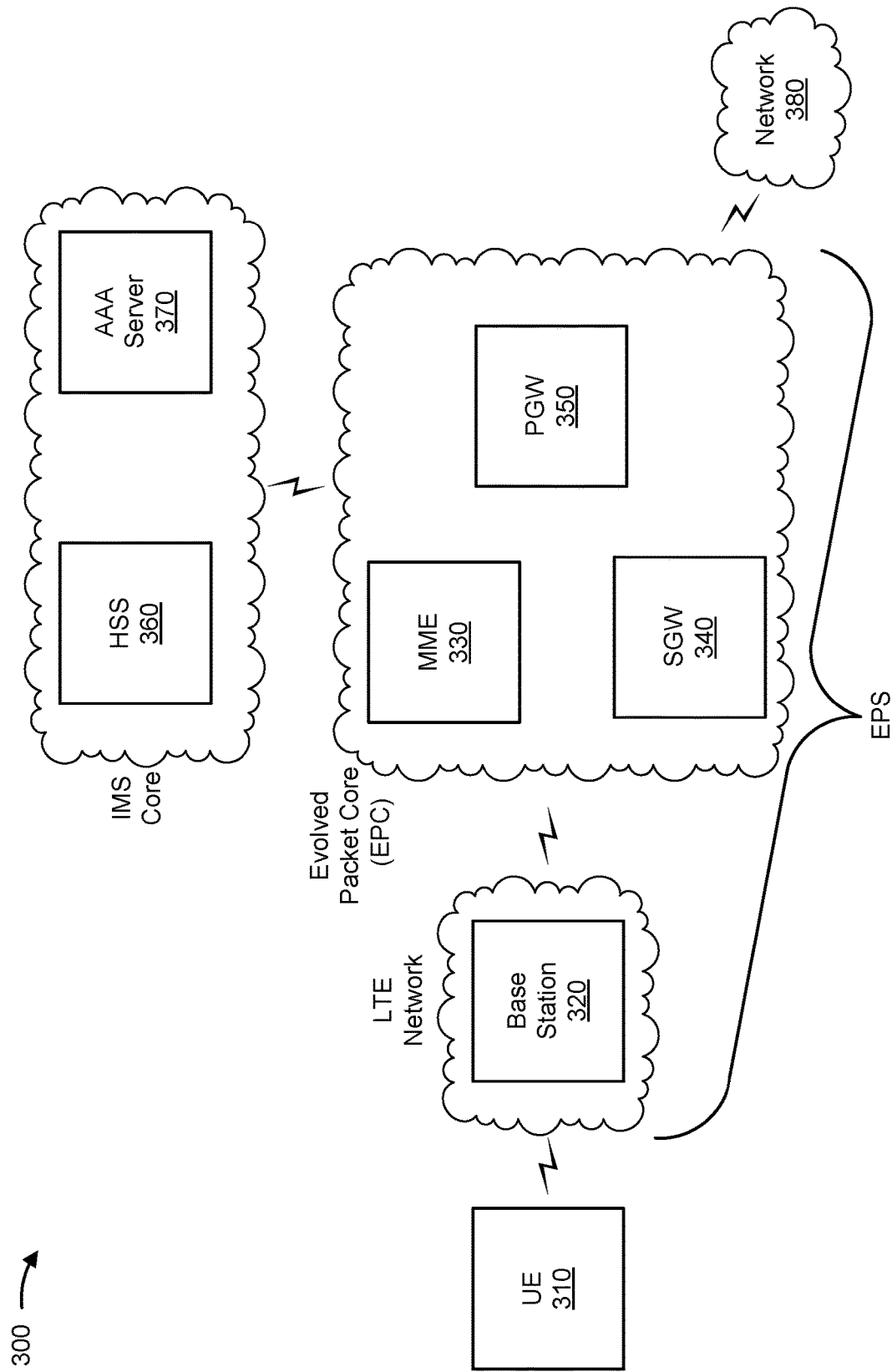
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a user equipment (UE) 310, a base station 320, a mobility management entity (MME) 330, a serving gateway (SGW) 340, a packet data network (PDN) gateway (PGW) 350, a home subscriber server (HSS) 360, an authentication, authorization, and/or accounting (AAA) server 370, and/or a network 380. Devices of environment 300 may interconnect via wired connections, wireless connections, or a combination of wired and wireless connections.

Some implementations are described herein as being performed within a long term evolution (LTE) network for explanatory purposes. Some implementations may be performed within a network that is not an LTE network, such as a third generation (3G) network, a fifth generation (5G) network, and/or the like.

Environment 200 may include an evolved packet system (EPS) that includes an LTE network and/or an evolved packet core (EPC) that operate based on a third generation partnership project (3GPP) wireless communication standard. The LTE network may include a radio access network (RAN) that includes one or more base stations 320 that take the form of evolved Node Bs (eNBs) via which UE 310 communicates with the EPC. The EPC may include MME 330, SGW 340, and/or PGW 350 that enable UE 310 to communicate with network 380 and/or an Internet protocol (IP) multimedia subsystem (IMS) core. The IMS core may include HSS 360 and/or AAA server 370, and may manage device registration and authentication, session initiation, etc., associated with UE 310. HSS 360 and/or AAA server 370 may reside in the EPC and/or the IMS core.

UE 310 includes one or more devices capable of communicating with base station 320 and/or a network (e.g., network 380). For example, UE 310 may include a wireless communication device, a radiotelephone, a personal communications system (PCS) terminal (e.g., that may combine a cellular radiotelephone with data processing and data communications capabilities), a smart phone, a laptop computer, a tablet computer, a personal gaming system, and/or a similar device. UE 310 may send traffic to and/or receive traffic from network 380 (e.g., via base station 320, SGW 340, and/or PGW 350).

In some implementations, UE 310 may be configured to utilize a connection release service. In some implementations, UE 310 may provide base station 320 with an attach request message (e.g., to connect to network 380) that includes one or more eligibility parameters. In some implementations, UE 310 may receive an attachment response message indicating that a connection with network 380 has been established. In some implementations, UE 310 may receive a connection release message with a network-layer-header (e.g., a radio resource control (RRC) connection release message) from base station 320. In some implementations, UE 310 may provide a connection release acknowledgement message (e.g., an RRC connection release message) to base station 320. In some implementations, UE 310 may perform one or more tasks, features, and/or functions that are described herein as being performed by base station 320.

Base station 320 includes one or more devices capable of transferring traffic, such as audio, video, text, and/or other traffic, destined for and/or received from UE 310. In some implementations, base station 320 may include an eNodeB associated with an LTE network that receives traffic from and/or sends traffic to network 380 via SGW 340 and/or PGW 350. Additionally, or alternatively, one or more base stations 320 may be associated with a radio access network (RAN) that is not associated with the LTE network. Base station 320 may send traffic to and/or receive traffic from UE 310 via an air interface. In some implementations, base station 320 may include a small cell base station, such as a base station of a microcell, a picocell, and/or a femtocell. In some implementations, base station 320 may alter (e.g., periodically) a base station identifier (e.g., a PCI) of base station 320, as described elsewhere herein.

In some implementations, base station 320 may be configured to provide UE 310 with a connection release service. For example, base station 320 may be configured with data that identifies one or more conditions that, if satisfied, allow base station 320 to determine that UE 310 is eligible to receive the connection release service and/or that allow base station 320 to determine to provide UE 310 with the connection release service.

In some implementations, base station 320 may encapsulate a connection release message with a network-layer header and/or may provide the connection release message to UE 310. In some implementations, base station 320 may receive a connection release acknowledgement message from UE 310. In some implementations, base station 320 may be configured with one or more retransmission conditions that dictate when base station 320 retransmits the connection release message to UE 310. In some implementations, base station 320 may update a data structure that is used to store state data that identifies a state of UE 310. In some implementations, base station 320 may perform one or more other actions described herein.

MME 330 includes one or more devices, such as one or more server devices, capable of managing authentication, activation, deactivation, and/or mobility functions associated with UE 310. In some implementations, MME 330 may perform operations relating to authentication of UE 310. Additionally, or alternatively, MME 330 may facilitate the selection of a particular SGW 340 and/or a particular PGW 350 to serve traffic to and/or from UE 310. MME 330 may perform operations associated with handing off UE 310 from a first base station 320 to a second base station 320 when UE 310 is transitioning from a first cell associated with the first base station 320 to a second cell associated with the second base station 320. Additionally, or alternatively, MME 330 may select another MME (not pictured), to which UE 310 should be handed off (e.g., when UE 310 moves out of range of MME 330).

SGW 340 includes one or more devices capable of routing packets. For example, SGW 340 may include a traffic transfer device, such as a gateway, a router, a modem, a switch, a firewall, a network interface card (MC), a hub, a bridge, a server device, an optical add/drop multiplexer (OADM), or any other type of device that processes and/or transfers traffic. In some implementations, SGW 340 may aggregate traffic received from one or more base stations 210 associated with the LTE network, and may send the aggregated traffic to network 380 (e.g., via PGW 350) and/or other network devices associated with an evolved packet core (EPC) and/or an Internet Protocol Multimedia Subsystem (IMS) core. SGW 340 may also receive traffic from network 380 and/or other network devices, and may send the traffic to UE 310 via base station 320. Additionally, or alternatively, SGW 340 may perform operations associated with handing off UE 310 to and/or from an LTE network.

PGW 350 includes one or more devices capable of providing connectivity for UE 310 to external packet data networks. For example, PGW 350 may include one or more data processing and/or traffic transfer devices, such as a gateway, a router, a modem, a switch, a firewall, a NIC, a hub, a bridge, a server device, an OADM, or any other type of device that processes and/or transfers traffic. In some implementations, PGW 350 may aggregate traffic received from one or more SGWs 215 and may send the aggregated traffic to network 380. Additionally, or alternatively, PGW 350 may receive traffic from network 380, and may send the traffic to UE 310 via SGW 340 and base station 320. PGW 350 may record data usage information (e.g., byte usage).

HSS 360 may include one or more devices, such as one or more server devices, capable of managing (e.g., receiving, generating, storing, processing, and/or providing) information associated with UE 310. For example, HSS 360 may manage subscription information associated with UE 310, such as information that identifies a subscriber profile of a user associated with UE 310, information that identifies services and/or applications that are accessible to UE 310, location information associated with UE 310, a network identifier (e.g., a network address) that identifies UE 310, information that identifies a treatment of UE 310 (e.g., quality of service information, a quantity of minutes allowed per time period, a quantity of data consumption allowed per time period, etc.), and/or similar information. HSS 360 may provide this information to one or more other devices of environment 300 to support the operations performed by those devices.

AAA server 370 may include one or more devices, such as one or more server devices, that perform authentication, authorization, and/or accounting operations for communication sessions associated with UE 310. For example, AAA server 370 may perform authentication operations for UE 310 and/or a user of UE 310 (e.g., using one or more credentials), may control access, by UE 310, to a service and/or an application (e.g., based on one or more restrictions, such as time-of-day restrictions, location restrictions, single or multiple access restrictions, read/write restrictions, etc.), may track resources consumed by UE 310 (e.g., a quantity of voice minutes consumed, a quantity of data consumed, etc.), and/or may perform similar operations.

Network 380 includes one or more wired and/or wireless networks. For example, network 380 may include a cellular network (e.g., a 5G network, a 4G network, such as an LTE network, a 3G network, a code division multiple access (CDMA) network, etc.), a public land user network (PLMN), a wireless local area network (e.g., a Wi-Fi network), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or other types of networks.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
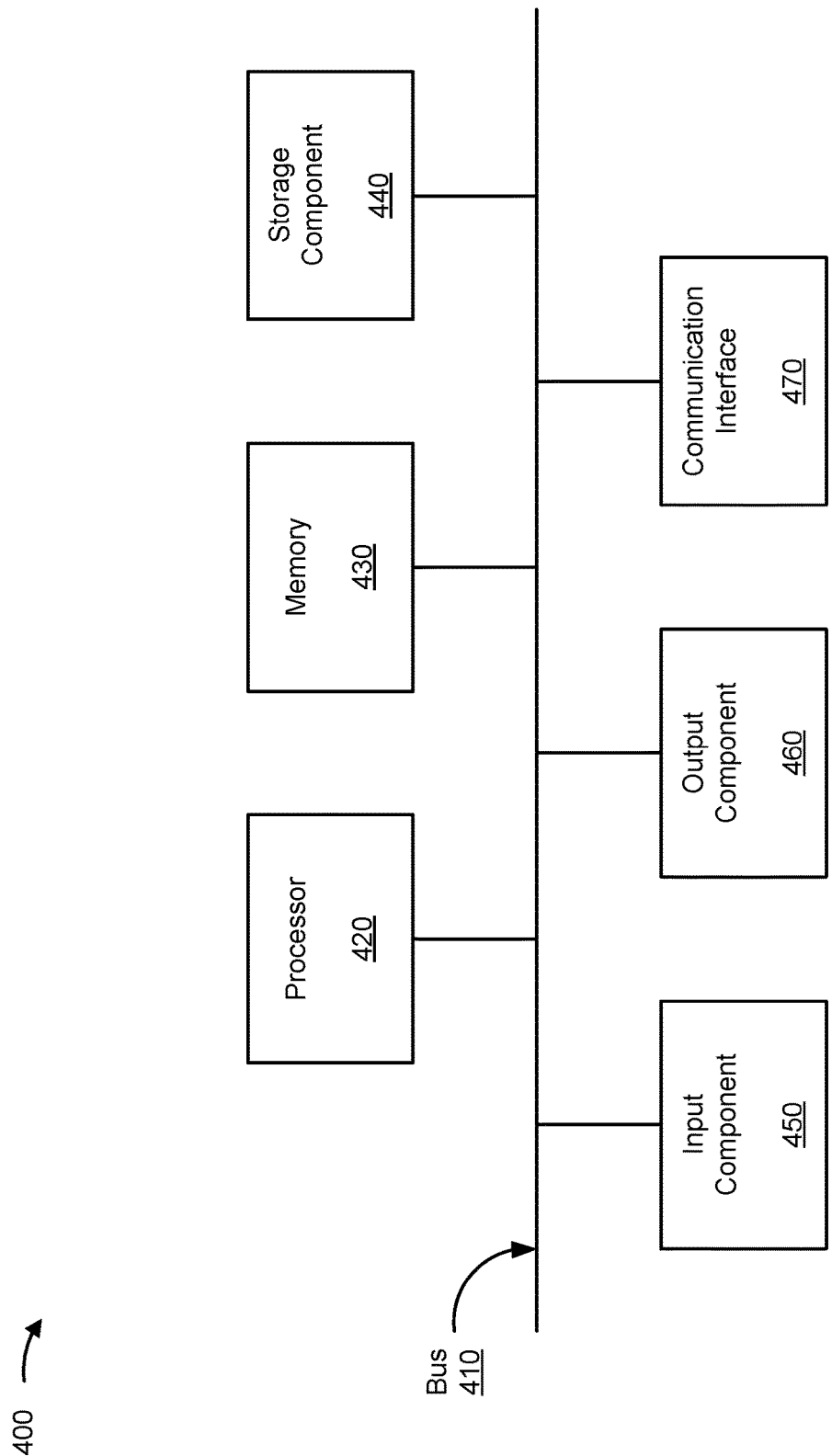
FIG. 4 is a diagram of example components of one or more devices of FIG. 3.

FIG. 4 is a diagram of example components of a device 400. Device 400 may correspond to UE 310, base station 320, MME 330, SGW 340, PGW 350, HSS 360, and/or AAA server 370. In some implementations, UE 310, base station 320, MME 330, SGW 340, PGW 350, HSS 360, and/or AAA server 370 may include one or more devices 400 and/or one or more components of device 400. As shown in FIG. 4, device 400 may include a bus 410, a processor 420, a memory 430, a storage component 440, an input component 450, an output component 460, and a communication interface 470.

Bus 410 includes a component that permits communication among multiple components of device 400. Processor 420 is implemented in hardware, firmware, and/or a combination of hardware and software. Processor 420 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processing component. In some implementations, processor 420 includes one or more processors capable of being programmed to perform a function. Memory 430 includes a random access memory (RAM), a read only memory (ROM), and/or another type of dynamic or static storage device (e.g., a flash memory, a magnetic memory, and/or an optical memory) that stores information and/or instructions for use by processor 420.

Storage component 440 stores information and/or software related to the operation and use of device 400. For example, storage component 440 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 450 includes a component that permits device 400 to receive information, such as via user input (e.g., a touch screen display, a keyboard, a keypad, a mouse, a button, a switch, and/or a microphone). Additionally, or alternatively, input component 450 may include a component for determining location (e.g., a global positioning system (GPS) component) and/or a sensor (e.g., an accelerometer, a gyroscope, an actuator, another type of positional or environmental sensor, and/or the like). Output component 460 includes a component that provides output information from device 400 (via, e.g., a display, a speaker, a haptic feedback component, an audio or visual indicator, and/or the like).

Communication interface 470 includes a transceiver-like component (e.g., a transceiver, a separate receiver, a separate transmitter, and/or the like) that enables device 400 to communicate with other devices, such as via a wired connection, a wireless connection, or a combination of wired and wireless connections. Communication interface 470 may permit device 400 to receive information from another device and/or provide information to another device. For example, communication interface 470 may include an Ethernet interface, an optical interface, a coaxial interface, an infrared interface, a radio frequency (RF) interface, a universal serial bus (USB) interface, a wireless local area network interface, a cellular network interface, and/or the like.

Device 400 may perform one or more processes described herein. Device 400 may perform these processes based on processor 420 executing software instructions stored by a non-transitory computer-readable medium, such as memory 430 and/or storage component 440. As used herein, the term "computer-readable medium" refers to a non-transitory memory device. A memory device includes memory space within a single physical storage device or memory space spread across multiple physical storage devices.

Software instructions may be read into memory 430 and/or storage component 440 from another computer-readable medium or from another device via communication interface 470. When executed, software instructions stored in memory 430 and/or storage component 440 may cause processor 420 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
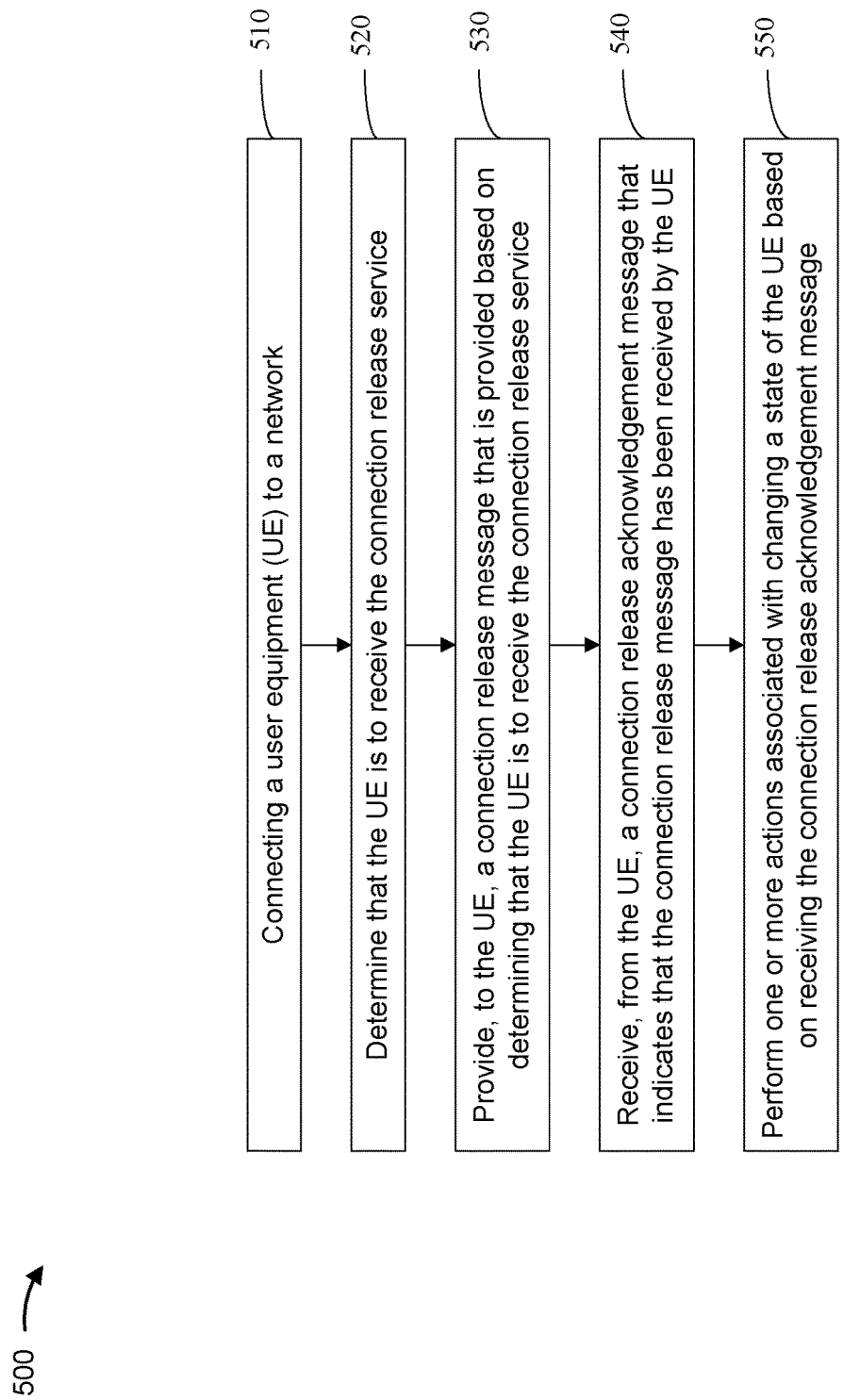
FIG. 5 is a flowchart of one or more example processes for using a connection release service to notify a user equipment (UE) that a state that the UE has with a network has changed (or is to be changed).

FIG. 5 is a flowchart of an example process 500 for systems and methods for using a connection release service to notify a user equipment (UE) that a state that the UE has with a network has changed (or is to be changed). In some implementations, one or more process blocks of FIG. 5 may be performed by a base station (e.g., base station 320). In some implementations, one or more process blocks of FIG. 5 may be performed by another device or a group of devices separate from or including the base station, such as a user equipment (UE) (e.g., UE 310), a mobility management entity (MME) (e.g., MME 330), a serving gateway (SGW) (e.g., SGW 340), a packet data network (PDN) gateway (PGW) (e.g., PGW 350), a home subscriber server (HSS) (e.g., HSS 360), an authentication, authorization, and/or accounting (AAA) server (e.g., AAA server 370), and/or the like.

As shown in FIG. 5, process 500 may include connecting the UE to a network (block 510). For example, the base station (e.g., using processor 420, memory 430, storage component 440, input component 450, output component 340, communication interface 340, and/or the like) may connect the UE (e.g., UE 310) to a network, as described above.

In some implementations, an attach request message, that is used to connect the UE to the network, may include one or more eligibility parameters for a connection release service. In some implementations, the one or more eligibility parameters may include a device type identifier that identifies a device type of the UE. In some implementations, the one or more eligibility parameters may include a device type category identifier that identifies a category of device type of the UE.

As further shown in FIG. 5, process 500 may include determining that the UE is to receive the connection release service (block 520). For example, the base station (e.g., using processor 420, memory 430, storage component 440, and/or the like) may determine that the UE is to receive the connection release service, as described above.

In some implementations, the base station may determine that the UE is to receive the connection release service based on the one or more eligibility parameters. In some implementations, the base station may determine that the UE is to receive the connection release service based on the one or more eligibility parameters including the device type identifier. In some implementations, the base station may determine that the UE is to receive the connection release service based on the one or more eligibility parameters including the device type category identifier.

In some implementations, while the UE is connected to the network, the base station may receive network performance indicator (NPI) data that identifies one or more NPIs associated with a connection that the UE has to the network. In this case, the base station may determine that the NPI data satisfies one or more threshold NPI values, and may determine that the UE is to receive the connection release service based on determining that the NPI data satisfies the one or more threshold NPI values. In some implementations, the NPI data may include at least one of: signal-to-interference-plus-noise ratio (SINR) data, reference signal received power (RSRP) data, or reference signal received quality (RSRQ) data.

As further shown in FIG. 5, process 500 may include providing, to the UE, a connection release message that is provided based on determining that the UE is to receive the connection release service (block 530). For example, the base station (e.g., using processor 420, memory 430, storage component 440, output component 460, communication interface 470, and/or the like) may provide, to the UE, a connection release message that is provided based on determining that the UE is to receive the connection release service, as described above. In some implementations, the connection release message may be a radio resource control (RRC) connection release message.

In some implementations (e.g., before providing the connection release message), the base station may associate the connection release message with a network-layer header. In this case, the base station may provide the connection release message, which has been associated with the network-layer header, to the UE.

In some implementations, the base station may retransmit the connection release message to the UE based on a retransmission condition being satisfied. In some implementations, the base station may determine that the retransmission condition has been satisfied a threshold number of times (e.g., based on a threshold number of unsuccessful attempts to transmit and/or retransmit the connection release message to the UE).

As further shown in FIG. 5, process 500 may include receiving, from the UE, a connection release acknowledgement message that indicates that the connection release message has been received by the UE (block 540). For example, the base station (e.g., using processor 420, memory 430, storage component 440, input component 450, communication interface 470, and/or the like) may receive, from the UE, a connection release acknowledgement message that indicates that the connection release message has been received by the UE, as described above.

In some implementations, the connection release acknowledgement message may be an RRC connection release acknowledgement message. In some implementations, the base station may receive an encapsulated connection release acknowledgement message that has been encapsulated with a network-layer header.

As further shown in FIG. 5, process 500 may include performing one or more actions associated with changing a state of the UE based on receiving the connection release acknowledgement message (block 550). For example, the base station (e.g., using processor 420, memory 430, storage component 440, input component 450, output component 340, communication interface 340, and/or the like) may perform one or more actions associated with changing a state of the UE based on receiving the connection release acknowledgement message, as described above.

In some implementations, the base station may cause resources allocated to the UE to be made available for one or more other UEs (e.g., one or more other UEs 310). In some implementations, the base station may update state data that identifies the state of the UE from a first value that identifies the state of the UE to a second value that identifies a new state of the UE. In some implementations, the base station may cause resources allocated to the UE to be made available for one or more other UEs. In some implementations, the base station may perform one or more actions based on determining that the retransmission condition has been satisfied the threshold number of times.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

What is claimed is:

1. A method, comprising:
connecting, by a base station, a user equipment (UE) to a network,
wherein an attach request message, that is used to connect the UE to the network, includes one or more eligibility parameters for a connection release service;
determining, by the base station and based on the one or more eligibility parameters, that the UE is eligible to receive the connection release service,
wherein the one or more eligibility parameters include at least one of:
a device type identifier,
a device type category identifier, or
a threshold network performance indicator (NPI) value;
determining, by the base station and based on one or more conditions being satisfied, that the UE is to receive the connection release service;
providing, by the base station and to the UE, a connection release message that is provided based on determining that the UE is to receive the connection release service;
receiving, by the base station and from the UE, a connection release acknowledgement message that indicates that the connection release message has been received by the UE,
wherein the connection release acknowledgement message is encapsulated with a network-layer header; and
performing, by the base station, one or more actions associated with changing a state of the UE based on receiving the connection release acknowledgement message.

2. The method of claim 1, further comprising:
encapsulating the connection release message with another network-layer header; and
wherein providing the connection release message to the UE comprises:
providing the connection release message, which has been encapsulated with the network-layer header, to the UE.

3. The method of claim 1, further comprising:
receiving, while the UE is connected to the network, NPI data that identifies one or more NPIs associated with a connection that the UE has to the network; and
wherein determining that the UE is to receive the connection release service comprises:
determining that the NPI data satisfies one or more threshold NPI values, and
determining that the UE is to receive the connection release service based on determining that the NPI data satisfies the one or more threshold NPI values.

4. The method of claim 1, wherein the connection release message is a radio resource control (RRC) connection release message; and
wherein the connection release acknowledgement message is an RRC connection release acknowledgement message.

5. The method of claim 1, wherein performing the one or more actions comprises:
causing resources allocated to the UE to be made available for one or more other UEs.

6. The method of claim 1, wherein performing the one or more actions comprises:
modifying a configuration of available resources based on receiving the connection release acknowledgement message.

7. The method of claim 1, wherein the one or more conditions include at least one of:
a first condition that is satisfied when the UE stops communicating with the network for a threshold time period, or
a second condition that is satisfied when a resource usage of the UE satisfies a threshold resource usage.

8. A base station, comprising:
one or more processors configured to:
determine, based on one or more eligibility parameters for a connection release service included in an attach request, that a user equipment (UE), that is connected to a network, is eligible to receive the connection release service,
wherein the attach request is used to connect the UE to the network, and
wherein the one or more eligibility parameters include at least one of:
a device type identifier,
a device type category identifier, or
a threshold network performance indicator (NPI) value;
determine, based on one or more conditions being satisfied, that the UE is to receive the connection release service;
provide, based on determining that the UE is to receive the connection release service, a connection release message to the UE,
wherein the connection release message is encapsulated with a network-layer header;
receive, from the UE, a connection release acknowledgement message that indicates that the connection release message has been received by the UE,
wherein the connection release acknowledgement message is encapsulated with another network-layer header; and
perform one or more actions associated with changing a state of the UE based on receiving the connection release acknowledgement message.

9. The base station of claim 8, wherein the one or more processors are further to:
receive, while the UE is connected to the network, NPI data that identifies one or more NPIs associated with a connection that the UE has to the network; and
wherein the one or more processors, when determining that the UE is to receive the connection release service, are to:
determine that the NPI data satisfies one or more threshold NPI values, and
determine that the UE is to receive the connection release service based on determining that the NPI data satisfies the one or more threshold NPI values.

10. The base station of claim 8, wherein the connection release message is a radio resource control (RRC) connection release message; and
wherein the connection release acknowledgement message is an RRC connection release acknowledgement message.

11. The base station of claim 8, wherein the one or more processors, when performing the one or more actions, are to:
update state data that identifies the state of the UE from a first value that identifies the state of the UE to a second value that identifies a new state of the UE.

12. The base station of claim 8, wherein the one or more processors, when performing the one or more actions, are configured to:
modify a configuration of available resources based on receiving the connection release acknowledgement message.

13. A non-transitory computer-readable medium storing instructions, the instructions comprising:
one or more instructions that, when executed by one or more processors of a base station, cause the one or more processors to:
connect a user equipment (UE) to a network,
wherein an attach request message, that is used to connect the UE to the network, includes one or more eligibility parameters for a connection release service;
determine, based on the one or more eligibility parameters, that the UE is eligible to receive the connection release service,
wherein the one or more eligibility parameters include at least one of:
a device type identifier,
a device type category identifier, or
a threshold network performance indicator (NPI) value;
determine, based on one or more conditions being satisfied, that the UE is to receive the connection release service;
transmit a connection release message to the UE based on determining that the UE is to receive the connection release service,
wherein the connection release message is encapsulated with a network-layer header;
retransmit the connection release message to the UE based on a retransmission condition being satisfied;
determine that the retransmission condition has been satisfied a threshold number of times; and
perform one or more actions based on determining that the retransmission condition has been satisfied the threshold number of times.

14. The non-transitory computer-readable medium of claim 13, wherein the one or more instructions, when executed by the one or more processors, further cause the one or more processors to:
receive, while the UE is connected to the network, NPI data that identifies one or more NPIs associated with a connection that the UE has to the network; and
wherein the one or more instructions, that cause the one or more processors to determine that the UE is to receive the connection release service, cause the one or more processors to:
determine that the NPI data satisfies one or more threshold NPI values, and
determine that the UE is to receive the connection release service based on determining that the NPI data satisfies the one or more threshold NPI values.

15. The non-transitory computer-readable medium of claim 14, wherein the NPI data includes at least one of:
signal-to-interference-plus-noise ratio (SINR) data,
reference signal received power (RSRP) data, or
reference signal received quality (RSRQ) data.

16. The non-transitory computer-readable medium of claim 13, wherein the connection release message is a radio resource control (RRC) connection release message.

17. The non-transitory computer-readable medium of claim 13, wherein the one or more instructions, that cause the one or more processors to perform the one or more actions, cause the one or more processors to:
   cause resources allocated to the UE to be made available for one or more other UEs.

18. The non-transitory computer-readable medium of claim 13, wherein the one or more instructions, that cause the one or more processors to perform the one or more actions, cause the one or more processors to:
   modify a configuration of available resources.

19. The non-transitory computer-readable medium of claim 13, wherein the one or more conditions include at least one of:
   a first condition that is satisfied when the UE stops communicating with the network for a threshold time period, or
   a second condition that is satisfied when a resource usage of the UE satisfies a threshold resource usage.

20. The non-transitory computer-readable medium of claim 13, wherein the one or more instructions, that cause one or more processors to perform the one or more actions, cause the one or more processors to:
   change a state of the UE based on determining that the retransmission condition has been satisfied the threshold number of times.

* * * * *